US012525121B2

(12) United States Patent
Linden

(10) Patent No.: US 12,525,121 B2
(45) Date of Patent: Jan. 13, 2026

(54) METHOD AND TEST DEVICE FOR VERIFYING THE FUNCTIONALITY OF AN INTAKE PARTICLE DETECTION SYSTEM

(71) Applicant: Wagner Group GmbH, Langenhagen (DE)

(72) Inventor: Oliver Linden, Hannover (DE)

(73) Assignee: Wagner Group GmbH (DE)

( * ) Notice: Subject to any disclaimer, the term of this patent is extended or adjusted under 35 U.S.C. 154(b) by 277 days.

(21) Appl. No.: 18/266,679

(22) PCT Filed: Dec. 13, 2021

(86) PCT No.: PCT/EP2021/085446
§ 371 (c)(1),
(2) Date: Aug. 2, 2024

(87) PCT Pub. No.: WO2022/128890
PCT Pub. Date: Jun. 23, 2022

(65) Prior Publication Data

US 2024/0386789 A1 Nov. 21, 2024

(30) Foreign Application Priority Data

Dec. 18, 2020 (EP) .................................... 20215275

(51) Int. Cl.
*G08B 29/14* (2006.01)
*G08B 17/10* (2006.01)

(52) U.S. Cl.
CPC ........... *G08B 29/145* (2013.01); *G08B 17/10* (2013.01)

(58) Field of Classification Search
None
See application file for complete search history.

(56) References Cited

U.S. PATENT DOCUMENTS

| | | | | |
|---|---|---|---|---|
| 740,650 A * | 10/1903 | Heiland | ................. | A01G 13/06 |
| 8,434,343 B2 * | 5/2013 | Rossiter | ................. | G08B 17/10 702/45 |
| 10,302,522 B2 * | 5/2019 | Williamson | .......... | G01M 3/243 |
| 2007/0103325 A1 * | 5/2007 | Wagner | .................. | G08B 17/10 340/584 |

(Continued)

FOREIGN PATENT DOCUMENTS

| | | | |
|---|---|---|---|
| DE | 10348565 A1 * | 5/2005 | ............... G01N 1/26 |
| WO | 2015/054749 A1 | 4/2015 | |

*Primary Examiner* — Muhammad Adnan
(74) *Attorney, Agent, or Firm* — Frank H. Foster; Kremblas & Foster

(57) ABSTRACT

A method for verifying the functionality of an intake particle detection system (100), in particular an intake fire detection system. A test fluid flow (220) within at least one pipe and/or hose line (110, 120) is directed in such a way that the test fluid (210) from the test fluid generator (230) enters the fluid conduction system (110, 120, 130) and exits from the one or more intake openings. Respective actual exit times from the introduction and/or entry of the test fluid (210) into the fluid conduction system until the exit of the test fluid (210) from a respective intake opening are detected by means of a timer. Detected actual exit times are compared with a data set (261) which is stored on a data carrier (160, 260), and which comprises target exit times and/or target exit time ranges associated with the respective intake openings (A, B, C, . . . X).

8 Claims, 5 Drawing Sheets

(56) References Cited

U.S. PATENT DOCUMENTS

| | | | | |
|---|---|---|---|---|
| 2014/0318218 | A1* | 10/2014 | Susel | G08B 29/145<br>73/24.01 |
| 2017/0061757 | A1* | 3/2017 | Zribi | G08B 17/10 |
| 2017/0301226 | A1* | 10/2017 | Lang | G08B 29/14 |

* cited by examiner

METHOD AND TEST DEVICE FOR VERIFYING THE FUNCTIONALITY OF AN INTAKE PARTICLE DETECTION SYSTEM

BACKGROUND OF THE INVENTION

The invention relates to a method for verifying the functionality of an intake particle detection system, in particular an intake fire detection system for detecting and/or localizing a fire and/or the source of a fire, which intake particle detection system has a fluid conduction system with at least one pipe and/or hose line which opens out via one or more intake openings for removing a fluid sample into one or more monitoring regions, wherein, in a first method step, a test fluid is provided, in particular generated, by means of a test fluid generator, which is fluidly connected or can be connected to the fluid conduction system is provided, in particular, generated by means of a test fluid generator which is fluidically conductively connected or connectable via a test fluid line and/or a test fluid connection of the fluid conduction system and, in a second method step, the test fluid is introduced via the test fluid line and/or the test fluid connection into the fluid conduction system, wherein a test fluid flow is generated within the at least one pipe and/or hose line.

The invention also relates to a test device for verifying the functionality of an intake particle detection system and to an intake particle detection system, in particular an intake fire detection system for detecting and/or localizing a fire and/or the source of a fire, having an integrated test device and a fluid conduction system with at least one pipe and/or hose line, which opens out via one or more intake openings for removing a fluid sample into one or more monitoring regions, a detection unit for detecting test particles contained in the fluid samples taken, in particular smoke particles, a flow means for generating a fluid sample flow within the at least one pipe and/or hose line, wherein the fluid sample flow is directed from the one or more intake openings in the direction of the detection unit, a programmable computing unit for evaluating signals transmitted by the detection unit, and a test fluid generator for providing a test fluid which test fluid generator is fluidically conductively connected or connectable to the fluid conduction system via a test fluid line and/or a test fluid connection.

Intake particle detection systems are often used to detect fires or to monitor potential sources of fire. For this purpose, an intake particle detection system comprises a fluid conduction system with at least one pipe and/or hose line, also referred to as "branch" or "pipe branch" in technical jargon, along which a plurality of intake openings are arranged or "connected" in series. In addition to intake particle detection systems with only one pipe branch, embodiments with branching pipe and/or hose lines are used, i.e. with two or more "branches" or "pipe branches" whose respective intake openings are then "connected" in parallel to the intake openings of another branch or pipe branch. The intake openings are each assigned to one or more monitoring regions, designated as such, and connect the fluid conduction system to the corresponding monitoring region via the respective pipe and/or hose line in a fluid-conducting manner. A fluid sample flow is generated within the one or more pipes and/or hose lines via a flow means, an intake device, which flow transports the respective fluid samples (air samples) taken or sucked in from the monitoring regions in the direction of a mostly centrally located detection unit. The detection unit detects test particles contained in the respective fluid samples, for example, smoke particles or smoke aerosols that can arise in the event of a fire or a fire hazard in the respective monitoring region. The detection unit is connected in a signal-conducting manner to a programmable computing unit which evaluates the signals transmitted by the detection unit, for example to detect a fire or a fire hazard.

Basically, a monitoring region is understood to be a region to which the fluid conduction system of the intake particle detection system is fluidically connected via at least one intake opening and which is monitored by continuously taking fluid samples, in particular air samples. The monitoring of buildings and building complexes by means of intake particle detection systems is known from the prior art, but also the monitoring of devices and/or apparatuses. For example, DE 10 2005 052 777 A1 discloses a device for fire detection in control cabinets. The device has an intake pipe system with a single pipe or pipe branch, which connects a plurality of adjacent control cabinets. The intake pipe system communicates with the individual control cabinets to be monitored via a respective one intake opening. In this context, a monitoring region corresponds to a control cabinet.

A similar fire detection device for detecting and locating a fire is known from DE 103 48 565 A1 in connection with monitoring buildings. In the case of building monitoring, a monitoring region is generally understood to mean a single room in the building to be monitored or, in the monitoring of larger halls and building complexes, also corresponding sub-areas of rooms. The fire detection device described in DE 103 48 565 A1, also referred to as an aspirative fire detection device, has an intake pipe system with a single pipe or pipe branch that communicates with each individual monitoring region or monitored room via at least one intake opening. A fluid sample flow is generated within the pipe in the direction of a central detector via a blower designed as an intake device, which transports the air samples sucked in from the individual monitoring rooms to the detector. After at least one fire parameter has been detected with the detector, the air samples in the intake pipe system are blown out to localize the location of the fire. For this purpose, the blower has a direction of rotation reversal and thus functions as a blow-out device at the same time. After blowing out, air samples are again taken from the individual monitoring rooms, wherein the transit time, also known as the transport time, is measured from the time the air sample is sucked in via the respective intake opening until it reaches the detector or until the detector detects a fire parameter again. Based on the transport time, the intake opening to be assigned to the fire parameter and thus the location of the fire can be localized.

In order to adjust and check the intake particle detection system prior to commissioning, DE 103 48 565 A1 also proposes positioning a smoke generator, which can artificially generate a fire parameter, in the vicinity of an intake opening. In general, it is also customary to check the functionality of the intake particle detection system prior to commissioning or maintenance. This depends to a large extent on whether the fluid conduction system has been correctly assembled or installed in accordance with the specifications for pipe cross-section, roughness and diameter of the intake openings, and the associated pipe accessories, such as fittings and filters, but also the distances between the respective components. During operation of the intake particle detection system, there may be restrictions on the functionality or changes in the target state of the fluid conduction system. These can be attributed to blockages, narrowing of the flow cross section, in particular pinching and/or leaks. To check, artificially generated smoke or a smoke aerosol is introduced as a test fluid via the intake openings using the smoke generator, and the transit time required for the transport of the smoke or the smoke aerosol from the respective intake opening to the detector or its sensor unit is determined for each individual intake opening. The transit times determined must be within a previously defined tolerance range. Carrying out such transit time measurements is very time-consuming, in particular in the case of high ceiling heights, and is often not possible without appropriate aids such as a telescopic work platform.

In practice, only the measurement of the transit time of the "last" intake opening of each pipe branch, i.e., the intake opening with the longest pipe length up to the detector, is often used to check the pipe system for reasons of economy. For example, U.S. Pat. No. 8,434,343 B2 discloses a solution in which a particle generator is positioned at the end of each pipe branch of a pipe system. In each case, the particle generator is arranged adjacent to or in the vicinity of the last intake opening of the corresponding pipe branch and is installed there. The functionality of the pipe system can be verified, as described above, based on the respective transit times, by sucking in the particles generated by the particle generator via the respective last intake openings of the individual pipe branches. Due to the limitation of the transit time measurement to the last intake openings of the pipe branches, however, the significance of the test is considerably limited.

Particle or smoke generators suitable for testing intake particle detection systems are known from the prior art. For example, U.S. Pat. No. 740,650 A discloses a smoke machine that generates smoke and collects it within a smoke chamber. A continuous flow of smoke can be provided via an outlet and introduced into a pipe system connected to the outlet.

U.S. Pat. No. 10,302,522 B2 discloses a method for checking a particle detection system, in which a smoke generator is connected to the pipe system of the particle detection system. With respect to the sample fluid flow, the smoke generator is located downstream of the piping containing the intake openings and upstream of the intake device. To check the functionality of the particle detector, the smoke generator generates a test fluid, in particular smoke. A flow is generated by means of the intake device, starting from the smoke generator in the direction of the particle detector to feed the smoke to its detection chamber. A failure of the particle detector is found if the smoke is not detected. U.S. Pat. No. 10,302,522 B2 proposes a different procedure for checking the pipe system, in which the smoke generator is not used, but instead air is blown into the pipe system. A reversal of the flow direction within the intake pipe system can be initiated by means of the intake device, such that an air flow is directed starting from the intake device in the direction of the intake openings. To check each individual intake opening, these are each equipped with a valve which switches from an open position to a closed position by reversing the air flow. Blockages and/or leaks can be detected by measuring the volume flow or the pressure within the pipe system. The proposed method is intended to avoid a time-consuming manual check of each individual intake opening. A disadvantage, however, is the need to equip the intake openings with valves, which not only increases the costs of the entire system, but also its susceptibility to malfunctions, for example due to valve jamming.

The object of the present invention is therefore to provide a method that is improved compared to the prior art and an improved test device for verifying the functionality of an intake particle detection system. In particular, the time and economic effort should be reduced while at the same time allowing an exact check with unrestricted significance of individual intake openings.

This object is achieved by a method for verifying the functionality of an intake particle detection system according to claim 1, a test device according to claim 6, and an intake particle detection system.

SUMMARY OF THE INVENTION

A method for verifying the functionality of an intake particle detection system of the type described in detail at the outset is characterized in that the test fluid flow within the at least one pipe and/or hose line is directed from the test fluid generator in the direction of the one or more intake openings, wherein, in a third method step, respective actual exit times from the introduction and/or entry of the test fluid into the fluid conduction system until the test fluid exits from a respective intake opening are recorded by means of a timer, and in a fourth method step, the recorded actual exit times are compared with a data set, in particular stored on a data carrier, which data set includes the target exit times and/or target exit time ranges associated with the respective intake openings.

According to the invention, a test fluid is therefore introduced into the fluid conduction system of the intake particle detection system by means of a test fluid generator. For this purpose, a test fluid flow through a suitable flow means, such as a fan or a blower, is generated starting from the test fluid generator in the direction of the intake openings, such that the test fluid exits from each of the intake openings after a respective transit time. The transit time specific for a respective intake opening, which the test fluid requires from being introduced and/or entering the fluid conduction system to exiting from the corresponding intake opening, is measured using a timer and recorded as the respective actual exit time. The timer, in particular a timer or a stopwatch, can be stored as software or a program application on a programmable computing unit, e.g. of the intake particle detection system, and is preferably started globally for all intake openings when the test fluid is introduced and/or is stopped locally when the test fluid exits the respective intake opening. In the simplest embodiment, the timer can also be started and/or stopped manually by a user.

The actual exit times of the respective intake openings recorded in this way are then compared with the target exit times and/or target exit time ranges associated with the corresponding intake openings. These are stored as a data set on a data carrier. The data carrier is, for example, a storage medium of the programmable computing unit, in which case the comparison of the actual exit times with the target exit times and/or ranges can then be carried out automatically by the programmable computing unit. However, printed products such as a user manual or handwritten tables are also suitable as data carriers, wherein the data set containing the target exit times and/or ranges are then stored in tabular form, for example, and are manually compared with the recorded actual exit times by the user.

The method according to the invention makes it possible to completely verify the functionality of different components of an intake particle detection system, in particular its fluid conduction system, including filters, fittings, pipe connections, and similar components as well as individual, multiple, or all intake openings and the (intermediate) pipe sections of the at least one pipe and/or hose line. For example, time required for verification can be significantly reduced by detecting the actual exit times at multiple or all intake openings in just a single process run, i.e. with a single introduction of test fluid into the fluid conduction system. At the same time, the informative value of the method is increased by checking different components of the intake particle detection system, in particular several intake openings and the corresponding pipe sections, compared to methods known from the prior art, resulting in a particularly economical method overall.

The implementation of the method according to the invention can be based on different test scenarios. A distinction is preferably made between three basic test scenarios: a check during (initial) commissioning of the intake particle detection system, a regular or routine check during operation of the intake particle detection system, and an (unscheduled) check when a fault is detected, e.g. if a deviation of the total fluid sample flow to be expected in the detection unit is determined. In turn, respective data sets with corresponding target exit times can be assigned to the individual test scenarios. Preferably, associated target exit times and/or ranges are calculated using project planning software for checking during commissioning, whereas the target exit times and/or ranges for routine or unscheduled testing during commissioning can be measured. A target exit time range, within which the recorded actual exit times should be, can be defined on the basis of the target exit times calculated and/or measured in one or more process runs.

In an advantageous continuation of the method, in a fifth method step, impairments in the functionality of the intake particle detection system, in particular deviations from planning to installation, leaks, pinching and/or blockages in the fluid conduction system, are detected if at least one of the recorded actual exit times differs from the respective associated target exit time and/or target exit time range.

For this purpose, a negative deviation, that is, when the recorded actual exit time is less than the associated target exit time or is below the predetermined target exit time range, is differentiated from a positive deviation, that is, when the recorded actual exit time is greater than the associated target exit time or is above the predetermined target exit time range. Depending on the test scenario, but also dependent on the individual structure of the fluid conduction system, e.g. on the pipe length and the resulting pressure differences, on the positioning of the intake openings along a pipe and/or hose line and/or on the pipe length between a respective intake opening and the test fluid generator, a positive or negative deviation of the actual exit times from the target exit times and/or ranges can indicate different causes or functional impairments. During commissioning, installation errors or deviations from the planning phase, e.g. due to deviations in the number of fittings used, different pipe lengths, etc., can be expected, which are due to the respective local installation conditions. In checks during operation, leaks, breaks, crushing (reduction of the flow cross section) and/or blockages (complete closure of the flow cross section) can then occur in the fluid conduction system and in particular at the intake openings. In addition, malfunctions of the fluid medium, such as fans or blowers, can be detected.

Advantageously, an assignment of deviations between target exit times and/or ranges and actual exit times to possible impairments of functionality can be determined using the flow properties of the intake particle detection system and can be determined in particular using project planning software and/or experimentally. An exemplary assignment for the test scenarios described above is shown below. Such an assignment can preferably be stored as part of the data set, digitally, or as a printed product on the data carrier:

Checking When Commissioning the Intake Particle Detection System

| Determination of the target exit times: | Calculation by project planning software |
|---|---|
| Test fluid exit times: | |
| Actual > target | Deviation from planning to installation and/or leakage in the fluid conduction system |
| Actual = target | no impairment |
| Actual < target | Deviation from planning to installation |

Routine Check of Intake Particle Detection System

| Determination of the target exit times: | Measurement during commissioning or after installation |
|---|---|
| Test fluid exit times: | |
| Actual > target | Crushing, breakage, and/or blockage in the fluid conduction system |
| Actual = target | No impairment |
| Actual < target | Blockage in the fluid conduction system |

Checking for Deviations in the Fluid Sample Flow in the Detection Unit

| Determination of the target exit times: | Measurement during commissioning or after installation |
|---|---|
| Case 1: | Total fluid sample flow too high |
| Test fluid exit times: | |
| Actual > target | Leak in the fluid conduction system |
| Actual = target | No impairment |
| Actual < target | Blockage in the fluid conduction system |
| Case 2: | Total fluid sample flow too low |
| Test fluid exit times: | |
| Actual = target | No impairment |
| Actual = target | Impairment of the operability of the flow means |
| Actual > target | Crushing and/or blockage in the fluid conduction system |

According to an advantageous variant of the method, the exit of the test fluid from the one or more intake openings is detected optically, manually by a user and/or by means of optical sensors in order to detect the respective actual exit times.

For example, one or more users can manually monitor the intake openings of one or more pipes and/or hose lines to detect escaping test fluid, e.g. measured with a stopwatch and noted manually. The noted actual exit times can then, also manually, be compared with the respective associated target exit times and/or ranges. Manual monitoring of the intake openings also enables localization of breaks or leaks if test fluid is observed exiting at a point in a pipe and/or hose line where no intake opening is provided. Alternatively or additionally, exiting of test fluid at one or more intake openings can also be detected by means of optical sensors, e.g. laser scanners or camera-based detection. In both cases, both in the case of manual and sensory, optical detection, one or more light sources can be aimed at the fluid conduction system, in particular at the intake openings, to improve the detectability of exiting test fluid. Detection by means of optical sensors is particularly suitable for carrying out the method in an automated manner.

According to an advantageous variant of the method, the detected actual exit times of the test fluid at one or more of the intake openings are compared with the target exit times and/or target exit time ranges associated with the respective intake openings by means of software and/or programming, wherein the target exit times and/or target exit time ranges are stored digitally on a storage medium of a programmable computing unit.

In particular before the test fluid is introduced into the fluid conduction system of the intake particle detection system via the test fluid pipe and/or the test fluid connection, the system can be cleaned in a cleaning step by blow-out and/or by means of compressed air, according to an optional process configuration.

Alternatively or additionally, the cleaning step can also be carried out after an impairment of the functionality of the intake particle detection system has been detected, e.g. for eliminating blockages in the fluid conduction system, in particular in the area of the at least one pipe and/or hose line and/or the intake openings.

According to an advantageous variant of the method, especially in the case of intake particle detection systems that have already been installed and put into operation, the data set, which includes the target exit times and/or target exit time ranges associated with the respective intake openings, can be determined using one or more exit time measurements and/or transit time measurements and stored on the data carrier.

To determine the desired exit times and/or ranges required for the method according to the invention, the actual exit times required by the test fluid from being introduced into the fluid conduction system to exiting at the respective intake openings can be measured once or multiple times. The measured exit times can then also be used to check the transport times or transit times that are usually stored for intake particle detection systems and that a suctioned fluid sample requires from entering the respective intake opening to reaching the detection unit and which are used in fire detection to localize the fire location. Conversely, however, it is also conceivable to base the determination of the target exit times and/or ranges on already existing transport times.

To ensure comparability of the respective transit times of the test fluid flow, starting from the test fluid generator to exiting the intake opening or of the fluid sample flow, starting from entering the intake opening to reaching the detection unit, it is advantageous to create similar or identical framework conditions. In a further development of this variant of the method, it is therefore provided that the flow properties of the test fluid flow, in particular its volume flow and/or flow velocity and/or mass flow, are adjusted via the fluid as required, with one or more of the set flow properties of the test fluid flow corresponding to the respective flow properties that correspond to the exit time measurements and/or are based on the transport time measurements. The fan or blower already installed in the intake particle detection system can preferably be used to set the flow properties and to generate the test fluid flow itself, thereby reducing the number of components additionally required for carrying out the method.

The object of the invention set at the outset is also achieved by a test device for verifying the functionality of an intake particle detection system, in particular according to a method according to one of the variants described above. According to the invention, the test device comprises a test fluid generator for generating and/or providing a test fluid, which generator is connected or connectable to the intake particle detection system in a fluid-conducting manner via a test fluid line and/or a test fluid connection of the fluid conduction system of the intake particle detection system, as well as a data set, in particular stored on a data carrier, which data set comprises target exit times and/or target exit time ranges, each associated with intake openings.

In the simplest configuration, the test device according to the invention thus comprises only the test fluid generator and a data set with target exit times and/or ranges. The test fluid generator can be designed, for example, as a smoke or aerosol generator or cartridge and can generate or provide a test fluid quantity that is preferably constant over time. The test fluid is introduced into the fluid conduction system of the intake particle detection system via a test fluid line or connection. Preferably, the test fluid can be introduced directly into the fluid conduction system, without test fluid escaping into the environment or monitoring rooms. For this purpose, for example, both the test fluid line or the test fluid connection and the test fluid generator have mutually complementary coupling means, such as threads or quick connectors, which enable a (gas-tight) fluid-conducting connection between the test fluid generator and the fluid conduction system.

The target exit times and/or ranges required for testing are contained in a data set and associated to the respective intake openings of the intake particle detection system to be tested. The data set, in turn, can be stored on a data carrier, which in the simplest version can be a user manual or written tables, but can also be a digital storage medium.

In principle, it is conceivable to record the actual exit times with a timer that is already provided as part of the intake particle detection system. In an advantageous embodiment, however, the test device has its own timer for determining the respective actual exit times from the introduction and/or entry of the test fluid into the fluid conduction system of the intake particle detection system until the test fluid exits from a respective intake opening.

Likewise, the required test fluid flow, which enables the transport of the test fluid from the test fluid generator to the respective intake openings, can be generated by a flow means of the intake particle detection system itself. In particular, the test fluid generated or provided by the test fluid generator could be sucked into the fluid conduction system by reversing the direction of rotation of the fan or blower. Preferably, however, according to an alternative embodiment, the test device itself (also) has one or more flow means for generating a test fluid flow within the at least one pipe and/or hose line and/or for adjusting flow properties of the test fluid flow, in particular the volume flow and/or the flow velocity and/or the mass flow.

The one or more flow means of the test device, for example a fan, a blower or a pump, facilitate the setting of a test fluid volume flow which is constant over time in order to improve the reproducibility of the test method. Aerosols such as smoke are used as the test fluid, which are transported by air or a gas mixture as a carrier flow to the respective intake openings. Adjusting the flow properties by means of the flow means makes it possible to adapt to different fluid conduction systems of different intake particle detection systems. In addition, the detectability of the test fluid escaping in particular at the intake openings can be improved by adjusting the carrier flow quantity and the liquid or solid particle proportion, in particular smoke proportion, by regulating the volume flow, the flow speed and/or the mass flow.

To further improve detectability, according to another, optional embodiment, the test device can have one or more light sources and/or one or more optical sensors, each for detecting the exiting of test fluid at one or more of the intake openings.

The light sources are preferably directed at the respective intake openings and facilitate both manual detection of exiting test fluid by an observer and automated detection using optical sensors.

For a manual or at least partially manual implementation of the method, the test device according to an advantageous variant has an input and/or output device for inputting the detected actual exit times of the test fluid and/or for outputting the target exit times and/or target exit time ranges associated with the respective intake openings.

Thus, both the time of introduction and/or entry of the test fluid into the fluid conduction system and the actual exit times at the respective intake openings can be recorded manually by a user, for example, and transmitted to the input and/or output device. Actual exit times recorded in advance, in particular manually, can also be stored on the input and/or output device by means of the control element or the touch screen. Conversely, the input and/or output device can be designed to output optical and/or acoustic signals, e.g. by means of a touchscreen, loudspeakers or lamps, which indicate the respective target exit times and/or target exit time ranges for the associated intake openings.

For a partially or also completely automated verification of the intake particle detection system, the test device in the embodiment of the invention comprises a programmable computing unit with a data carrier, in particular a storage medium on which the data set is stored digitally, as well as software and/or programming for comparing recorded actual exit times with the target exit times and/or target exit time ranges associated with the respective intake openings.

Both the data set containing the target exit times and/or target exit time ranges and the software and/or programming for comparison with the actual exit times can be stored on the data carrier. The latter are either recorded manually by a user, as described above, and in particular transmitted to the programmable computing unit by means of an operating element of the input and/or output device, or recorded and forwarded automatically by means of optical sensors.

Alternatively, a programmable computing unit of the intake particle detection system could also be used to compare the stored target exit times and/or target exit time ranges with the recorded actual exit times. According to an optional embodiment, the test device therefore has a digital interface for the data and signal-transmitting connection to the intake particle detection system, in particular to a programmable computing unit of the intake particle detection system. Via the digital interface, the data set contained in particular on the data carrier of the test device can also be transferred directly to a storage medium of the intake particle detection system, which makes retrofitting of intake particle detection systems that have already been installed and put into operation considerably easier.

Finally, therefore, an intake particle detection system is also the subject matter of the invention. This system has a test fluid generator for providing a test fluid, which generator is connected or connectable to the fluid conduction system of the intake particle detection system in a fluid-conducting manner by means of a test fluid line and/or a test fluid connection.

According to the invention, a flow means for generating a test fluid flow is connected or connectable to the at least one pipe and/or hose line in a fluid-conducting manner in such a way that the test fluid can be introduced into the pipe and/or hose system and transported within the at least one pipe and/or hose line by means of the test fluid flow in the direction of the one or more intake openings. A data set which is preferably stored on a data carrier, a storage medium of the programmable computing unit, includes the target exit times and/or target exit time ranges associated with the intake openings, which are required for the transport of the test fluid from the introduction and/or entry into the fluid conduction system to its exit from a respective intake opening.

Either the fluid of the intake particle detection system itself can be used as the fluid for generating the test fluid flow by reversing the direction of rotation, or one or more additional fluids are provided, in particular as part of the test fluid generator.

The test fluid generator can optionally only be connected to the fluid conduction system of the intake particle detection system for carrying out the method, or it can be permanently or fixedly integrated or permanently connected to it. In the latter case in particular, it can be advantageous to connect a ball cock and/or a valve between the test fluid generator and the test fluid line and/or the test fluid connection to be able to disconnect the fluid-conducting connection of the test fluid generator with the fluid conduction system as required.

According to an advantageous embodiment of the intake particle detection system, the test fluid line and/or the test fluid connection opens into a central pipe section of the fluid conduction system, which connects the one or more pipes and/or hose lines and the detection unit to one another in a fluid-conducting manner.

This embodiment variant is particularly suitable for verifying an intake particle detection system with multiple branches. By feeding the test fluid into a central pipe section via the test fluid line and/or the test fluid connection, the pipe and/or hose lines adjoining the central pipe section downstream with respect to the test fluid flow direction, as well as the respective intake openings, can be tested simultaneously using the same test fluid generator.

In another, alternative embodiment variant, the test fluid line and/or the test fluid connection opens into a local pipe section of the fluid conduction system, in particular into the at least one pipe and/or hose line, wherein the test fluid line and/or the test fluid connection is continuous with a rear pipe end of the at least one pipe and/or hose line facing away from the detection unit.

The test fluid line and/or the test fluid connection preferably opens into the respective pipe and/or hose line upstream of the "rearmost" intake opening, i.e. has the greatest pipe length up to the detection unit in relation to the fluid sample flow. In this case, the test fluid line and/or the test fluid connection is an extension of the respective pipe and/or hose line. Alternatively, the test fluid line and/or the test fluid connection can also be provided between two adjacent intake openings.

To check multiple branches of an intake particle detection system, it is also conceivable to locally connect a test fluid generator (simultaneously) to a pipe and/or hose line, or to connect the same test fluid generator to the individual pipe and/or hose lines one after the other.

BRIEF DESCRIPTION OF THE SEVERAL VIEWS OF THE DRAWINGS

Further advantages, features, and details of the invention will be apparent from the following description of a preferred exemplary embodiment and from the drawings. Wherein.

The figures are merely of an exemplary nature and only contribute to better understanding the invention. Like elements are provided with like reference numerals and are usually only explained once.

DETAILED DESCRIPTION OF THE INVENTION

Figure 1:
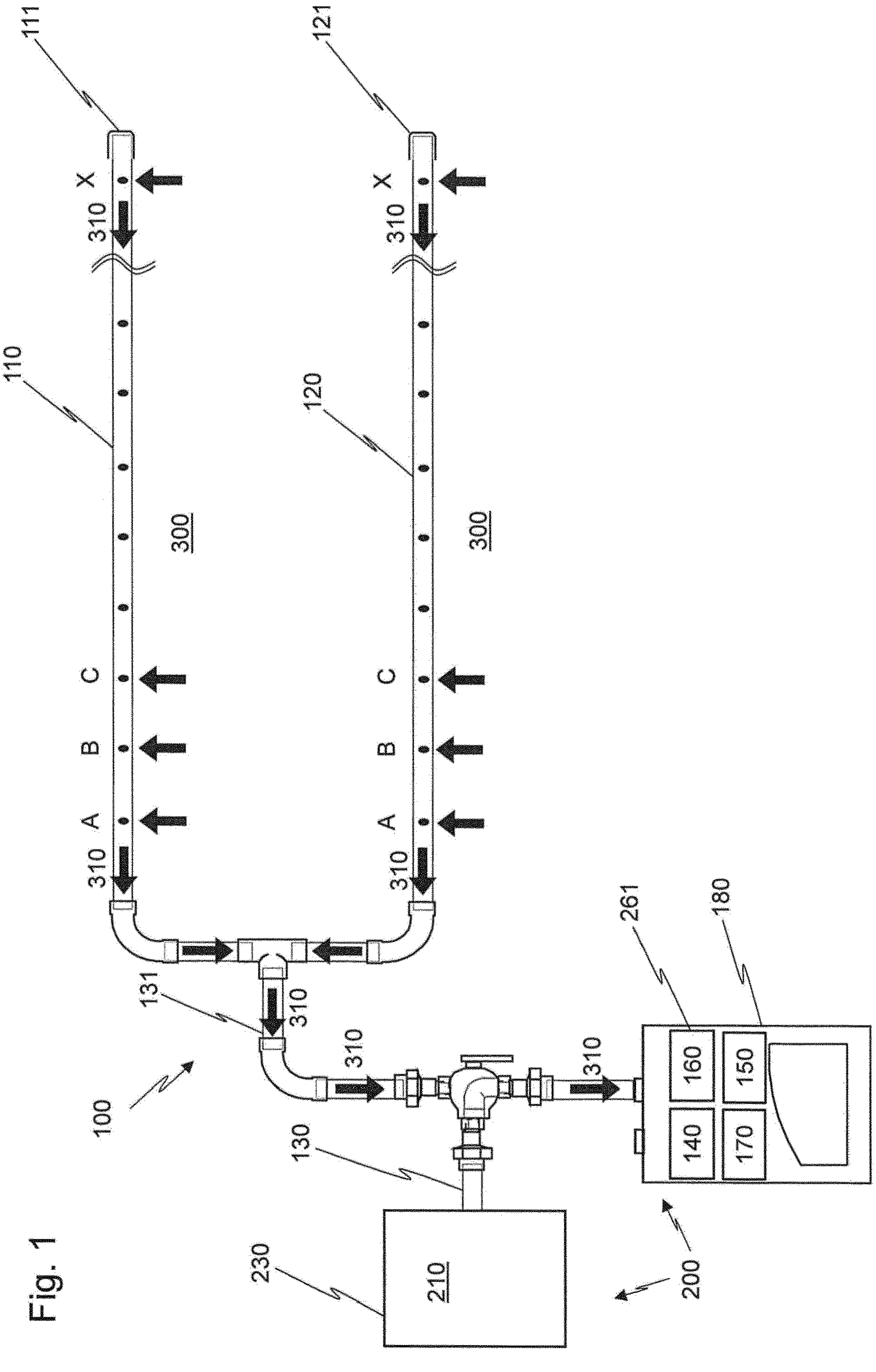
FIG. 1 shows a schematic representation of a first exemplary embodiment of an intake particle detection system according to the invention, wherein a fluid sample flow is generated during normal operation.

The schematic representation of FIG. 1 shows a first exemplary embodiment of an intake particle detection system 100 according to the invention. The intake particle detection system 100 shown here, as an exemplary embodiment, comprises a fluid conduction system 110, 120, 130 having two branches, that is, a first pipe and/or hose line 110 (first branch) and a second pipe and/or hose line 120 (second branch). The pipes and/or hose lines 110, 120 open into respective monitoring regions 300 via respective intake openings A, B, C, . . . X. For example, the monitoring regions 300 are two separate rooms in a building, wherein one of the pipes and/or hose lines 110, 120 passes through each room. The rear pipe ends 111, 121 facing away from the detection unit are closed. The pipes and/or hose lines 110, 120 open into a central detection unit 180 via a common, central pipe section 131. In order to detect and/or localize a fire and/or the source of a fire, fluid samples are continuously taken from the monitoring regions 300 via the intake openings A, B, C . . . X during normal operation of the intake particle detection system 100 and supplied to the detection unit 180. For this purpose, a fluid sample flow 310 is generated within the pipe and/or hose lines 110, 120 via a flow means 140 of the intake particle detection system 100, e.g. an intake device, a fan or a blower, which is directed from the intake openings A, B, C, . . . X in the direction of the detection unit 180. The detection unit 180 detects particles contained in the fluid samples, in particular smoke particles. The detected signals are then transmitted to a programmable computing unit 170 of the intake particle detection system 100 and evaluated there to detect a fire and/or the source of a fire.

A test fluid line 130 to which a test fluid generator 230 of a test device 200 is connected opens into the central pipe section 131 via a ball valve. Depending on the position of the ball valve, a test fluid 210 produced or provided by the test fluid generator 230 can be introduced into the fluid conduction system 110, 120, 130 via the test fluid line 130. In the normal operation of the intake particle detection system 100 shown here, the fluid-conducting connection between the test fluid line 130 and the central pipe section 131 is preferably closed by the ball valve. The test device 200 also includes a data set 261 which, in the exemplary embodiment shown here, is stored on a data carrier 160 of the intake particle detection system 100, in particular a digital storage medium of the programmable computing unit 170.

Figure 2:
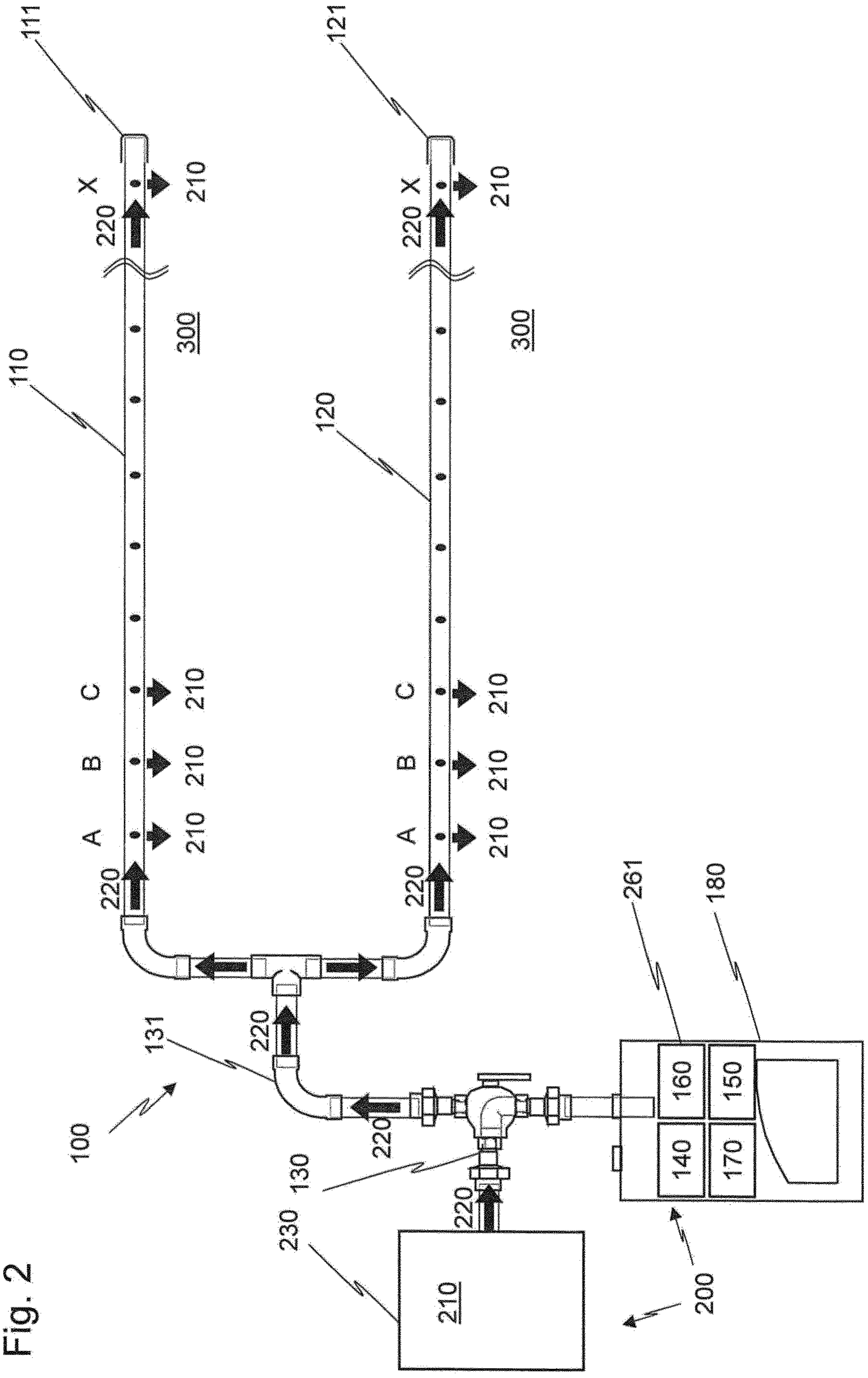
FIG. 2 shows a schematic representation of the intake particle detection system from FIG. 1, wherein a test fluid flow is generated to carry out the method according to the invention.

FIG. 2 shows a schematic representation of the intake particle detection system 100 from FIG. 2, wherein a test fluid flow 220 is generated within the pipe and/or hose lines 110, 120 to carry out the method according to the invention. For this purpose, for example, the direction of rotation of the flow means 140 can be reversed and the ball valve can be opened, such that a test fluid flow 220 directed against the fluid sample flow 310 is generated in this first exemplary embodiment. The test fluid flow 220 is always directed from the test fluid generator 230 in the direction of the intake openings A, B, C, . . . X, such that the test fluid 210 is introduced or “sucked in” into the fluid conduction system 110, 120, 130 via the test fluid line 130 and is transported inside the pipes and/or hose lines 110, 120 by means of the test fluid flow 220 in the direction of the intake openings A, B, C, . . . X.

The data set 261 contains the target exit times and/or target exit time ranges $t_{target,A}$, $t_{target,B}$, $t_{target,C}$, . . . $t_{target,X}$, which are required for the transport of the test fluid 210 from the introduction and/or entry into the fluid line system 110, 120, 130, here specifically into the central pipe section 131, to the exit from the corresponding intake opening A, B, C, . . . X. The intake openings A, B, C, . . . X are arranged in succession along the respective pipe and/or hose line 110, 120, or “connected in series” with respect to the test fluid flow 220, such that in principle each intake opening A, B, C, . . . X has a specific exit time. In the case of the branched fluid conduction system 110, 120, 130 with two branches shown here, however, intake openings A and C of the first pipe and/or hose line 110, for example, can also have a similar or identical exit time or be in the same exit time range as the test fluid flow 220 “connected in parallel” intake openings A and C of the second pipe and/or hose line 120. The target exit times and/or target exit time ranges contained in the data set 261 are compared with the actual exit times $t_{actual,A}$, $t_{actual,B}$, $t_{actual,C}$, . . . $t_{actual,X}$ associated with the respective intake openings A, B, C, . . . X, which are optionally manually or automatically recorded, to verify the functionality of the intake particle detection system 100. A timer 150 of the intake particle detection system, for example, can be used to record the actual exit times $t_{actual,A}$, $t_{actual,B}$, $t_{actual,C}$, . . . $t_{actual,X}$. In the case of an automated evaluation, a corresponding message can be output acoustically or optically via a screen, in particular a touchscreen.

Figure 3:
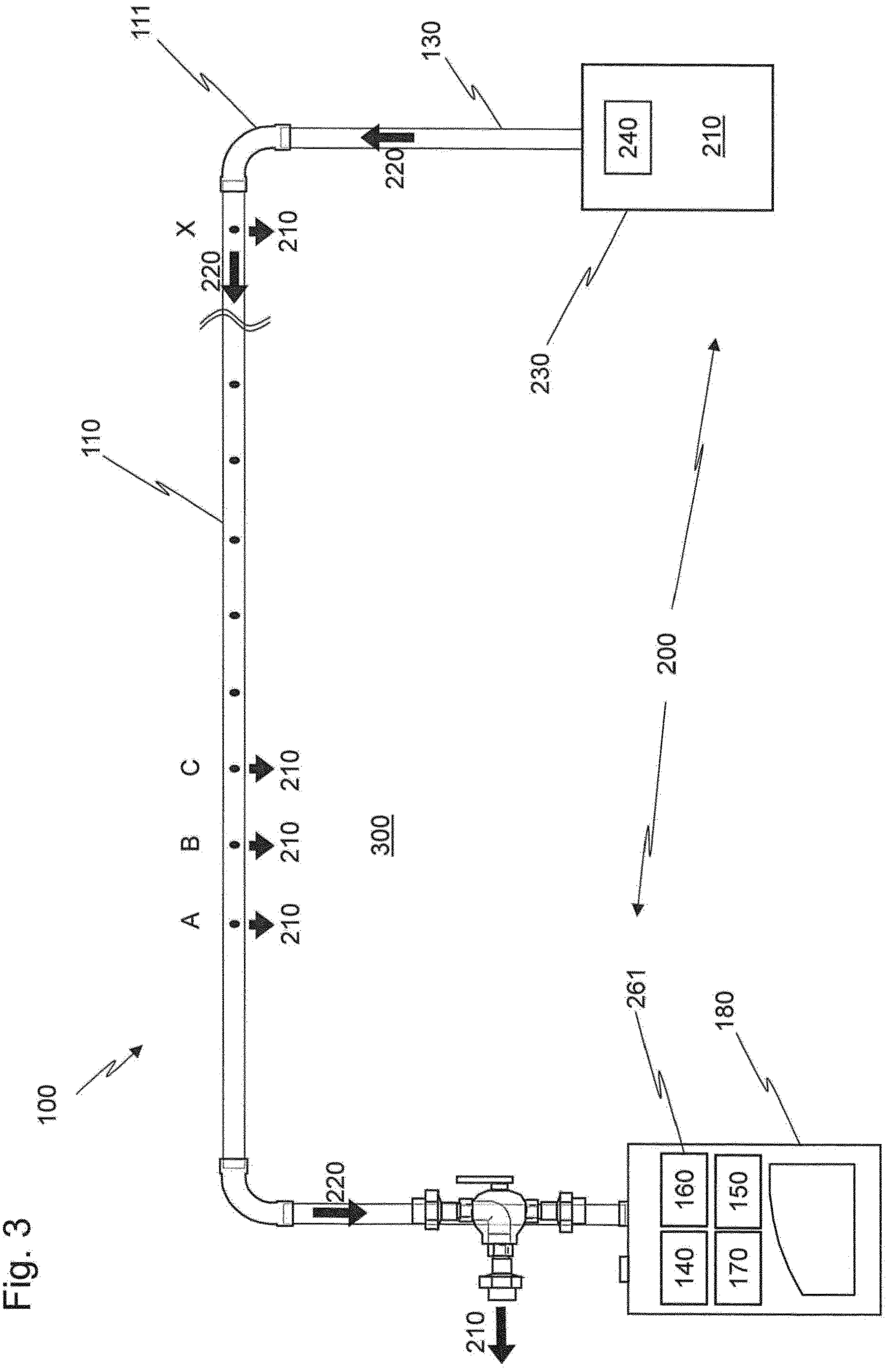
FIG. 3 shows a schematic representation of a second exemplary embodiment of an intake particle detection system according to the invention, wherein a test fluid flow is generated to carry out the method according to the invention.

A schematic representation of a second exemplary embodiment of an intake particle detection system 100 according to the invention can be seen in FIG. 3. The exemplary embodiment shown here differs from the first exemplary embodiment in that the intake particle detection system 100 has only one branch or pipe and/or hose line 110 and the test fluid generator 230 opens via a test fluid line 130 into the rear pipe end 111 facing away from the detection unit 180 of the first pipe and/or hose line 110. A flow means 240, in particular a pump, a fan, or a blower, of the test device 200 causes a flow of test fluid 220 within the pipe and/or hose line 110, starting from the test fluid generator 230 in the direction of the intake openings A, B, C, . . . X, and directed along the fluid sample flow 310 in this second embodiment. Of course, the flow means 140 of the intake particle detection system 100 can also be used to generate the test fluid flow 220 in this embodiment variant. Test fluid 210, which has not already exited through one of the intake openings A, B, C, . . . X or due to a leak from the pipe and/or hose line 110 in the method for verifying the functionality of the intake particle detection system 100, is removed by means of the ball cock from the fluid conduction system 110, 130 before it reaches the detection unit 180.

Figure 4:
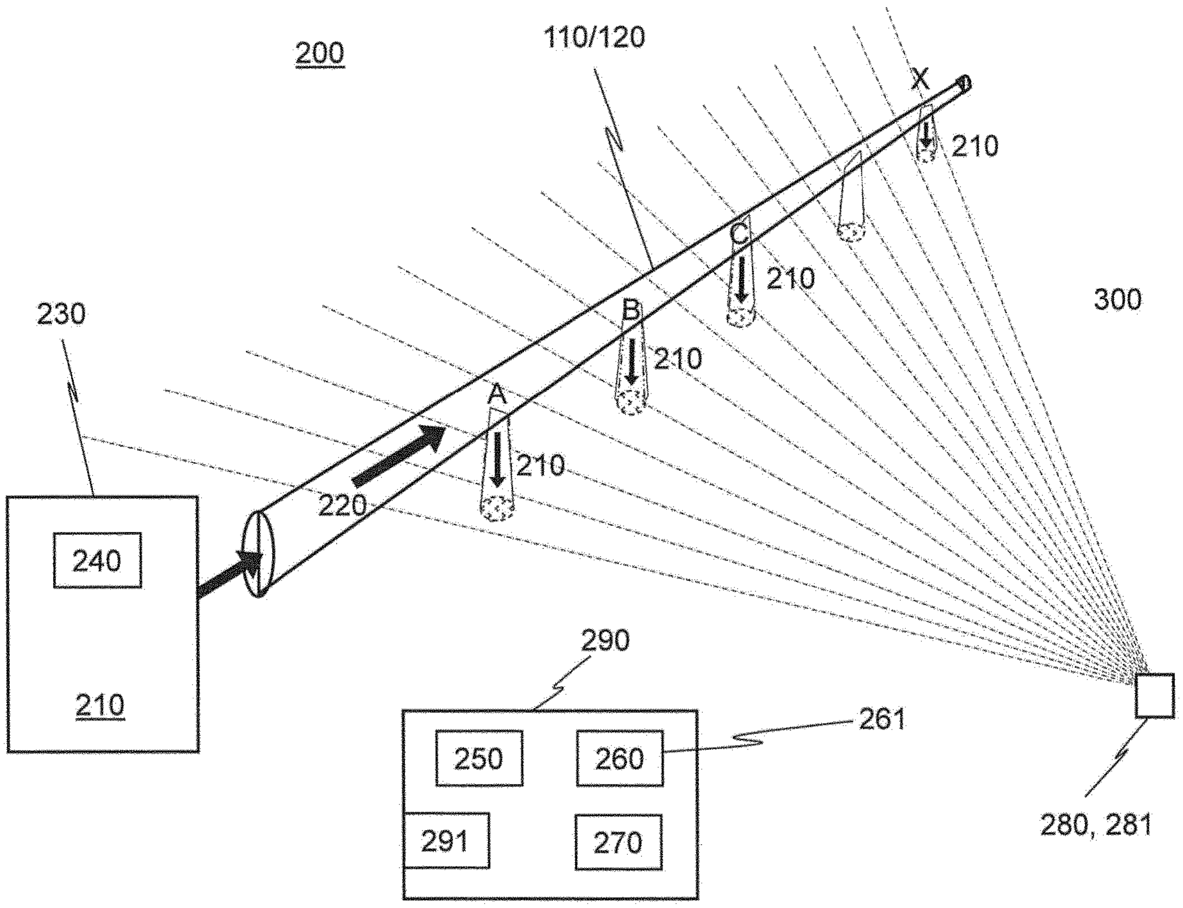
FIG. 4 shows a schematic, perspective representation of an exemplary embodiment of a test device according to the invention.

A schematic perspective representation of a test device 200 according to the invention is shown in FIG. 4. The test device 200 comprises a test fluid generator 230 and a data set 261 as essential components. The test fluid generator 230 is designed to generate and/or provide a test fluid 210, which in particular can be a smoke generator or a smoke cartridge. The test fluid 210 that is generated is introduced into the fluid conduction system 110, 120, 130 of an intake particle detection system 100 via a test fluid line and/or a test fluid connection 130 (not shown here), which is indicated here by way of example using a pipe and/or hose line 110, 120. An optional flow means 240 of the test device 200, e.g. a pump, a blower, or a fan, a test fluid flow 220 can be generated starting from the test fluid generator 230 in the direction of the intake openings A, B, C, . . . X arranged along the pipe and/or hose line 110, 120, such that the test fluid 210 exits from the intake openings A, B, C, . . . X within a respective transit time or exits due to leakages from intermediate pipe sections of the pipe and/or hose line 110, 120. The respective transit time, i.e. the actual exit time t $t_{actual,A}$, $t_{actual,B}$, $t_{actual,C}$, . . . $t_{actual,X}$ associated with each intake opening A, B, C, . . . X can be measured using a timer 250 of the test device 200, in that the exit of the test fluid 210 is monitored manually or automatically by means of optical sensors 280. In the present exemplary embodiment, a laser scanner is installed in the monitoring room 300 as the optical sensor 280, which is directed at the intake openings A, B, C, . . . X opening into the monitoring room 300. The laser scanner also acts as a light source 281 and thus facilitates both manual and automated detection of exiting test fluid 210.

The respective recorded actual exit times $t_{actual,A}$, $t_{actual,B}$, $t_{actual,C}$, . . . $t_{actual,X}$ are compared with associated target exit times and/or target exit time ranges $t_{target,A}$, $t_{target,B}$, $t_{target,C}$, . . . $t_{target,X}$ to verify the functionality of the intake particle detection system 100. The target exit times and/or target exit time ranges $t_{target,A}$, $t_{target,B}$, $t_{target,C}$, . . . $t_{target,X}$ are specified in advance, e.g. by means of a configuration software or by practical measurements, and then combined into a data set 261. The data set 261 assigns a respective specific target exit time and/or target exit time range $t_{target,A}$, $t_{target,B}$, $t_{target,C}$, . . . $t_{target,X}$ to the intake openings A, B, C, . . . X. The data set 261 can be stored on a data medium 260 of the test device 200. The data carrier 260, for example a storage medium, can in turn be part of a programmable computing unit 270 of the test device 200. By means of software and/or programming stored on the programmable computing unit 270, the comparison of the stored target exit times and/or target exit time ranges $t_{target,A}$, $t_{target,B}$, $t_{target,C}$, . . . $t_{target,X}$ to verify the functionality of the intake particle detection system 100 can be carried out with the established actual exit times $t_{actual,A}$, $t_{actual,B}$, $t_{actual,X}$, . . . $t_{actual,X}$. The timer 250, the data carrier 260 and the programmable computing unit 270 are preferably accommodated in a common housing of an input and/or output device 290, a so-called service tool or service device.

The input and/or output device 290 is used on the one hand to enter the recorded actual exit times $t_{actual,A}$, $t_{actual,B}$, $t_{actual,C}$, . . . $t_{actual,X}$, e.g. manually via an operating element such as a touchscreen or by signal-conducting connection with the optical sensors 280. On the other hand, messages, e.g. the detection of a malfunction of the intake particle detection system 100 or information such as the stored target exit times and/or target exit time ranges $t_{target,A}$, $t_{target,B}$, $t_{target,C}$, . . . $t_{target,X}$ can be output acoustically and/or optically, in particular also via the touch screen. Using a digital interface 291, in particular a cable connection or a wireless (radio) connection, such as a network, the test device 200 can be connected to the intake particle detection system 100, preferably to its programmable computing unit 170, in a data and/or signal-transmitting manner. In this way, components of the intake particle detection system 100, such as its flow means 140 or timer 150, can be used to carry out the method for verifying the functionality of the intake particle detection system 100.

Figure 5:
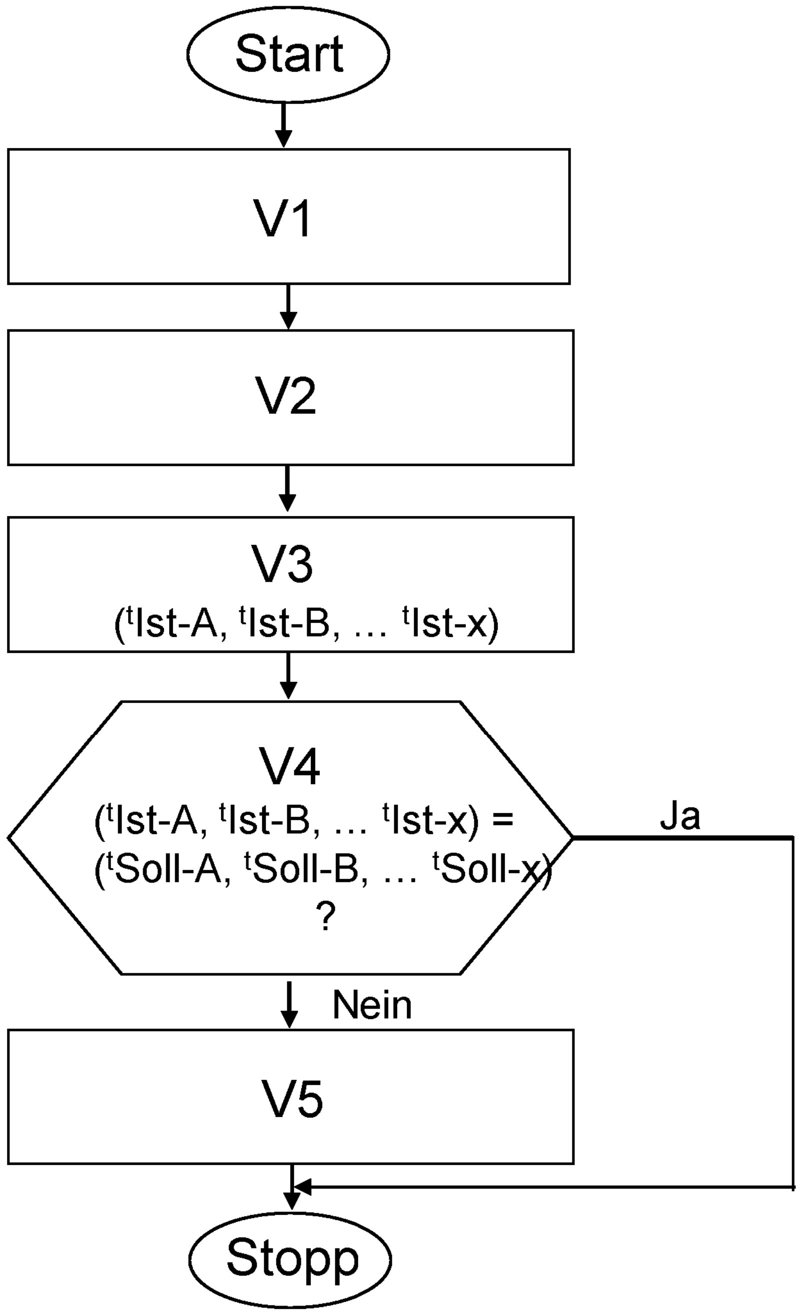
FIG. 5 shows a flow chart of an exemplary sequence of the method according to the invention.

Finally, an exemplary sequence or run through of a method according to the invention for verifying the functionality of an intake particle detection system 100 can be seen in a flowchart shown in FIG. 5. Such a verification may be performed at startup, routinely, or upon detection of a fluid sample failure. The respective verification can be based on the test scenarios described at the outset together with a corresponding data set 261. In a first method step V1, a test fluid 210 is generated and/or provided by a test fluid generator 230 of a test device 200. The test fluid generator 230 is connected via a test fluid line and/or a test fluid connection 130 to the fluid conduction system 110, 120, 130 of the intake particle detection system 100 to be verified. In a second method step V2, the test fluid 210 is introduced into the fluid conduction system 110, 120, 130 via the test fluid line and/or the test fluid connection 130. For this purpose, a test fluid flow 220 is generated within at least one pipe and/or hose line 110, 120 of the intake particle detection system 100 by means of a flow means 140, 240. Starting from the test fluid generator 230, the test fluid flow 220 is directed in the direction of the intake openings A, B, C, . . . X arranged along the pipe and/or hose line 110, 120. In a third method step V3, the respective actual exit times $t_{actual,A}$, $t_{actual,B}$, $t_{actual,C}$, . . . $t_{actual,X}$, which the test fluid 210 detects from introducing and/or entering the fluid conduction system 110, 120, 130 until it emerges from the corresponding intake opening A, B, C, . . . X. A timer 150, 250 is used for this.

In a fourth method step V4, the detected actual exit times $t_{actual,A}$, $t_{actual,B}$, $t_{actual,C}$, . . . $t_{actual,X}$ are compared with the target exit times and/or target exit time ranges $t_{target,A}$, $t_{target,B}$, $t_{target,C}$, . . . $t_{target,X}$ associated with the respective intake openings A, B, C, . . . X. If the exit times compared are identical or the recorded actual exit times $t_{actual,A}$, $t_{actual,B}$, $t_{actual,C}$, . . . $t_{actual,X}$ are within the stored target exit time ranges $t_{target,A}$, $t_{target,B}$, $t_{target,C}$, . . . $t_{target,X}$(=Yes), the method can end or a process run can be completed, depending on the underlying test scenario. For the next verification, the method is started again at the first method step V1.

If a deviation of the detected actual exit times $t_{actual,A}$, $t_{actual,B}$, $t_{actual,C}$, . . . $t_{actual,X}$ from the respectively associated target exit time and/or the target exit time range $t_{target,A}$, $t_{target,B}$, $t_{target,C}$, . . . $t_{target,X}$ is determined (=No) in the fourth method step V4, an impairment of the functionality of intake particle detection system 100 is detected in a fifth method step V5. This is again dependent on the underlying test scenario, e.g. deviations from planning for installation, leaks, crushing, and/or blockages in the fluid conduction system 110, 120, 130.

Between the individual process runs, either before the first method step V1, i.e. before the test fluid 210 is introduced, or after the fifth method step V5, i.e. if an impairment has been determined, a respective cleaning step can be carried out in which the fluid conduction system 110, 120, 130 is cleaned by blowing out and/or by means of compressed air. On the one hand, this can improve the reproducibility of the method, and on the other hand, any impairments to the functionality that have been detected, such as blockages, can be eliminated.

LIST OF REFERENCE SYMBOLS

100 intake particle detection system
110 first pipe and/or hose line
111 rear pipe end
120 second pipe and/or hose line
121 rear pipe end
130 test fluid line and/or test fluid connection
131 central pipe section
140 flow means of the intake particle detection system
150 timer of the intake particle detection system
160 data carrier of the intake particle detection system
170 programmable computing unit of the intake particle detection system
180 detection unit
200 test device
210 test fluid
220 test fluid flow
230 test fluid generator
240 flow means of the test device
250 timer of the test device
260 data carrier of the test device
261 data set
270 programmable computing unit of the test device
280 optical sensor
281 light source
290 input and/or output device
291 interface
300 monitoring region
310 fluid sample flow
A, B, C, . . . X intake openings
V1 first method step
V2 second method step
V3 third method step
V4 fourth method step
V5 fifth method step
$t_{actual,A}$, $t_{actual,B}$, $t_{actual,C}$, . . . $t_{actual,X}$ actual exit times
$t_{target,A}$, $t_{target,B}$, $t_{target,C}$, . . . $t_{target,X}$ target exit times and/or target exit time ranges

The invention claimed is:

1. A method for verifying the functionality of an intake particle detection system (100), which intake particle detection system (100) has a fluid conduction system (110, 120, 130) with at least one pipe or hose line (110, 120) which opens out via one or more intake openings (A, B, C, . . . X) for respectively removing a fluid sample into one or more monitoring regions (300), wherein in a first method step (V1), a test fluid (210) is generated or provided by means of a test fluid generator (230), which is connected or connectable to the fluid conduction system (110, 120, 130) in a fluidically conductive manner via a test fluid line or a test fluid connection (130) of said system, in a second method step (V2), the test fluid (210) is introduced into the fluid conduction system (110, 120, 130) via the test fluid line or the test fluid connection (130), wherein a test fluid flow (220) is generated via a flow means (140, 240) within the at least one pipe or hose line (110, 120), characterized in that the test fluid flow (220) within the at least one pipe or hose line (110, 120) is directed from the test fluid generator (230) in the direction of the one or more intake openings (A, B, C, . . . X) in such a way that the test fluid (210) enters the fluid conduction system (110, 120, 130) from the test fluid generator (230) via the test fluid line or the test fluid connection (130) and exits from the one or more intake openings (A, B, C, . . . X), wherein in a third method step (V3), respective actual exit times (($t_{actual,A}$, $t_{actual,B}$, $t_{actual,C}$, . . . $t_{actual,X}$) from the introduction or entry of the test fluid (210) into the fluid conduction system (110, 120, 130) until the test fluid (210) exits from the respective intake opening (A, B, C, . . . X) are recorded by means of a timer (150, 250), and in a fourth method step (V4), the recorded actual exit times ($t_{actual,A}$, $t_{actual,B}$, $t_{actual,C}$, . . . $t_{actual,X}$) are compared with a data set (261) stored on a data carrier (160, 260), which data set includes target exit times or target exit time ranges ($t_{target}$,A, $t_{target}$,B, $t_{target,C}$, . . . $t_{target,X}$) associated with the respective intake openings (A, B, C, . . . X).

2. The method according to claim 1, characterized in that in a fifth method step (V5), impairments in the functionality of the intake particle detection system (100), are detected if at least one of the recorded actual exit times ($t_{actual,A}$, $t_{actual,B}$, $t_{actual,C}$, . . . $t_{actual,X}$) deviates from the associated target exit time or the target exit time range ($t_{target,A}$, $t_{target,B}$, $t_{target,C}$, . . . $t_{target,X}$).

3. The method according to claim 2, characterized in that the exit of the test fluid (210) from the one or more intake openings (A, B, C, . . . X) to record the respective actual exit times ($t_{actual,A}$, $t_{actual,B}$, $t_{actual,C}$, . . . $t_{actual,X}$) is recorded optically, manually by a user, or by means of optical sensors (280).

4. The method according to claim 3, characterized in that the data set (261) is stored digitally on a data carrier (160, 260), and the recorded actual exit times ($t_{actual,A}$, $t_{actual,B}$, $t_{actual,C}$, . . . $t_{actual,X}$) of the test fluid (210) are compared at one or more of the intake openings (A, B, C, . . . X) with the respective target exit times or target exit time ranges ($t_{target,A}$, $t_{target,B}$, $t_{target,C}$, . . . $t_{target,X}$) associated with the intake openings (A, B, C, . . . X) by means of software or programming.

5. The method according to claim 1, characterized in that the fluid conduction system (110, 120, 130) of the intake particle detection system (100) is cleaned by blowing it out or by means of compressed air in a cleaning step before the test fluid (210) is introduced into it via the test fluid line or the test fluid connection (130).

6. An intake particle detection system (100), with an integrated test device (200), the intake particle detection system (100) having:

a fluid conduction system (110, 120, 130) with at least one pipe or hose line (110, 120) which opens into one or more monitoring regions (300) via one or more intake openings (A, B, C, . . . X) for the respective removal of a fluid sample, a detection unit (180) for detecting test particles contained in the fluid samples taken, a flow means (140, 240) for generating a fluid sample flow (310) within the at least one pipe or hose line (110, 120), wherein the fluid sample flow (310), starting from the one or more intake openings (A, B, C, . . . X), is directed in the direction of the detection unit (180), a programmable computing unit (170) for evaluating signals transmitted by the detection unit (180), and a test fluid generator (230) for providing a test fluid (210), which generator is connected or connectable to the fluid conduction system (110, 120, 130) in a fluid-conducting manner via a test fluid line or a test fluid connection (130), characterized in that a flow means (140, 240) for generating a test fluid flow (220) is connected or connectable in a fluid-conducting manner to the at least one pipe or hose line (110, 120), such that the test fluid (210) can be introduced into the fluid conduction system (110, 120, 130) and transported within the at least one pipe or hose line (110, 120) by means of the test fluid flow (220) in the direction of the one or more intake openings (A, B, C, . . . X), wherein a data set (261) is stored on a non-transitory data carrier (160) and comprises target exit times or target exit time ranges ($t_{target,A}$, $t_{target,B}$, $t_{target,C}$, . . . $t_{target,X}$) respectively associated with the intake openings (A, B, C, . . . X), which target exit times or target exit time ranges are required for transporting the test fluid (210) from its introduction or entry into the fluid conduction system (110, 120, 130) until exiting from the respective intake opening (A, B, C, . . . X).

7. The intake particle detection system (100) according to claim 6, characterized in that the test fluid line or the test fluid connection (130) opens into a central pipe section (131) of the fluid conduction system (110, 120, 130), which connects the one or more pipes or hose lines (110, 120) and the detection unit (180) with each other in a fluid-conducting manner.

8. The intake particle detection system (100) according to claim 6, characterized in that the test fluid line or the test fluid connection (130) opens into a local pipe section of the fluid conduction system (110, 120, 130), wherein the test fluid line or the test fluid connection (130) connects to a rear pipe end (111, 121) of the at least one pipe or hose line (110, 120) facing away from the detection unit (180).

* * * * *